US012613453B2

(12) United States Patent
Mahoney

(10) Patent No.: US 12,613,453 B2
(45) Date of Patent: Apr. 28, 2026

(54) OPTICAL SHUTTER SYSTEM

(71) Applicant: Eagle Technology, LLC, Melbourne, FL (US)

(72) Inventor: John Mahoney, Penngrove, CA (US)

(73) Assignee: Eagle Technology, LLC, Melbourne, FL (US)

( * ) Notice: Subject to any disclaimer, the term of this patent is extended or adjusted under 35 U.S.C. 154(b) by 174 days.

(21) Appl. No.: 18/790,768

(22) Filed: Jul. 31, 2024

(65) Prior Publication Data

US 2026/0036877 A1 Feb. 5, 2026

(51) Int. Cl.
G03B 9/10 (2021.01)

(52) U.S. Cl.
CPC ..................................... G03B 9/10 (2013.01)

(58) Field of Classification Search
CPC ....................................................... G03B 9/10
See application file for complete search history.

(56) References Cited

U.S. PATENT DOCUMENTS 4,606,624 A * 8/1986 Wood ................... A61B 3/0285
351/234
5,258,797 A * 11/1993 Oyoshi .................... G03B 9/14
396/132

6,229,136 B1 * 5/2001 Banks .................... G02B 7/021
359/822
10,057,469 B2 * 8/2018 Leonelli, Jr. ........... H04N 7/183
12,563,171 B1 * 2/2026 Strandborg .......... H04N 13/327
2012/0207466 A1 8/2012 Timpel et al.
2014/0070083 A1 * 3/2014 Zhang ................. G02B 26/008
359/891

FOREIGN PATENT DOCUMENTS

GB 2518224 A 3/2015
JP H08248475 A 9/1996

* cited by examiner

*Primary Examiner* — Antoinette T Spinks
(74) *Attorney, Agent, or Firm* — Edell, Shapiro & Finnan, LLC

(57) ABSTRACT

The techniques described herein relate to an apparatus including: a first optical element rotatably mounted to an axis; a second optical element rotatably mounted to the axis; a drive system including: a first protrusion associated with the first optical element, a first slot associated with the first optical element, a second protrusion associated with the second optical element, and a second slot associated with the second optical element; and a motor configured to: drive the drive system through a first range of motion to engage the first protrusion with the first slot to rotate the first optical element from a first position to a second position, and drive the drive system through a second range of motion to engage the second protrusion with the second slot to rotate the second optical element from a third position to a fourth position.

20 Claims, 10 Drawing Sheets

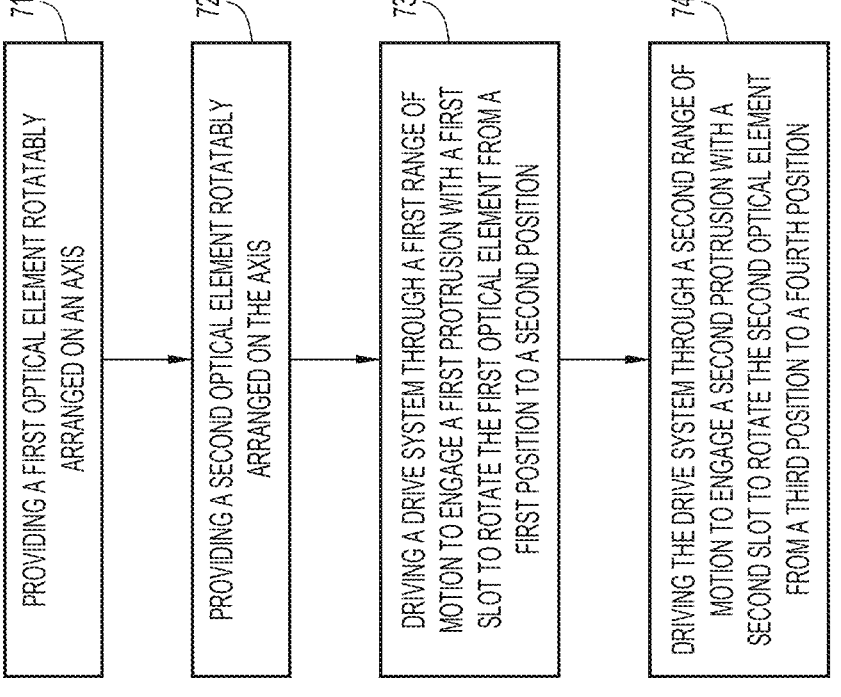

PROVIDING A FIRST OPTICAL ELEMENT ROTATABLY ARRANGED ON AN AXIS

710

PROVIDING A SECOND OPTICAL ELEMENT ROTATABLY ARRANGED ON THE AXIS

720

DRIVING A DRIVE SYSTEM THROUGH A FIRST RANGE OF MOTION TO ENGAGE A FIRST PROTRUSION WITH A FIRST SLOT TO ROTATE THE FIRST OPTICAL ELEMENT FROM A FIRST POSITION TO A SECOND POSITION

730

DRIVING THE DRIVE SYSTEM THROUGH A SECOND RANGE OF MOTION TO ENGAGE A SECOND PROTRUSION WITH A SECOND SLOT TO ROTATE THE SECOND OPTICAL ELEMENT FROM A THIRD POSITION TO A FOURTH POSITION

OPTICAL SHUTTER SYSTEM

TECHNICAL FIELD

The present disclosure relates to optical shutter systems.

BACKGROUND

Optical shutters are devices designed to control the transmission of light through an optical system. Typically composed of opaque materials like metal or polymers, these shutters can block or allow light to pass by moving into or out of the light path. In their simplest form, optical shutters operate similarly to mechanical blinds, opening or closing to regulate the amount of light reaching a sensor or detector. This functionality is crucial in various applications where precise control over light exposure is needed, such as in photography, laser systems, and microscopy.

BRIEF DESCRIPTION OF THE DRAWINGS

FIG. 7 is a flowchart providing a process flow for operating a shutter system, according to an example embodiment.

DETAILED DESCRIPTION

Overview

Figure 1A:
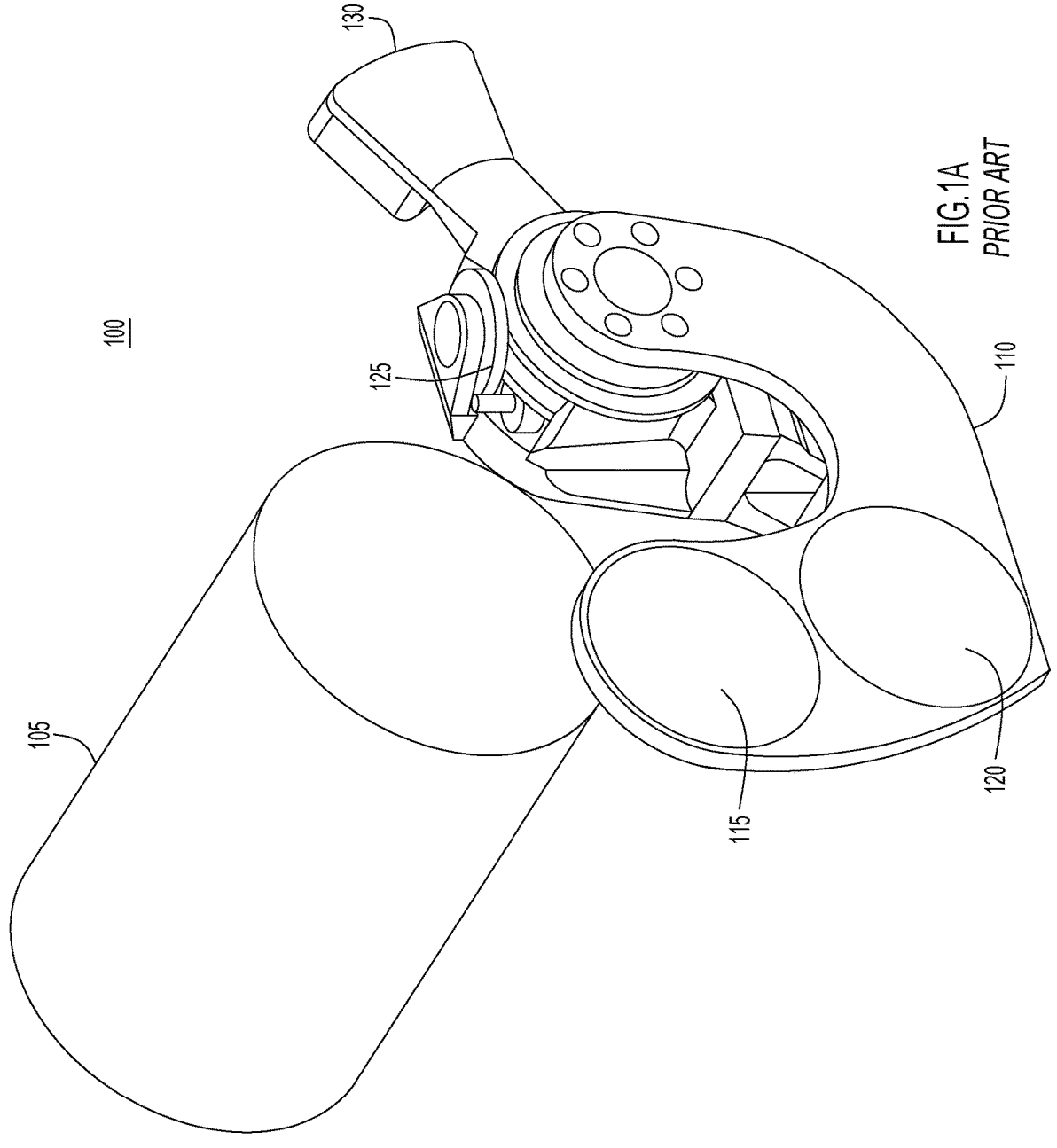
FIG. 1A illustrates an optical shutter system in a first of three positions.

In some aspects, the techniques described herein relate to an apparatus including: a first optical element rotatably mounted to an axis; a second optical element rotatably mounted to the axis; a drive system including: a first protrusion associated with the first optical element, a first slot associated with the first optical element, a second protrusion associated with the second optical element, and a second slot associated with the second optical element; and a motor configured to: drive the drive system through a first range of motion to engage the first protrusion with the first slot to rotate the first optical element from a first position to a second position, and drive the drive system through a second range of motion to engage the second protrusion with the second slot to rotate the second optical element from a third position to a fourth position. In some aspects, the drive system includes a Geneva drive and in other aspects the drive system includes a bevel gear drive.

In some aspects, the techniques described herein relate to a method including: providing a first optical element rotatably arranged on an axis; providing a second optical element rotatably arranged on the axis; driving a drive system through a first range of motion to engage a first protrusion with a first slot to rotate the first optical element from a first position to a second position; and driving the drive system through a second range of motion to engage a second protrusion with a second slot to rotate the second optical element from a third position to a fourth position.

In some aspects, the techniques described herein relate to an apparatus including: imaging optics that include an optical path through the imaging optics; a first optical element rotatably mounted to an axis; a second optical element rotatably mounted to the axis; a drive system including: a first protrusion associated with the first optical element, a first slot associated with the first optical element, a second protrusion associated with the second optical element, and a second slot associated with the second optical element; and a motor configured to: drive the drive system through a first range of motion to engage the first protrusion with the first slot to rotate the first optical element from a first position outside the optical path to a second position in the optical path, and drive the drive system through a second range of motion to engage the second protrusion with the second slot to rotate the second optical element from a third position outside the optical path to a fourth position in the optical path.

EXAMPLE EMBODIMENTS

Nonuniformity correction (NUC) in infrared (IR) imaging systems refers to the process of compensating for variations in sensitivity among the individual detector elements (pixels) in the IR sensor array. These variations can result in image artifacts such as pixel-level brightness variations or "fixed pattern noise." Nonuniform imaging correction aims to mitigate these issues to produce more accurate and reliable thermal images.

NUC may take place in a number of different stages, which include:

Background Correction: One common method involves capturing a reference image of a uniform temperature source (often referred to as a "blackbody") before or after the main imaging process. This reference image helps establish a baseline of the sensor's response and identifies any pixel-to-pixel variations in sensitivity.

Calibration Algorithms: Various algorithms are used to analyze the differences between the reference image and the actual captured images. These algorithms typically include gain and offset adjustments applied to each pixel to normalize their responses.

Shutter Correction: Some IR cameras use a shutter mechanism to periodically close and capture a dark frame (an image with no incoming IR radiation). This dark frame helps in identifying and correcting for fixed pattern noise and drift in the sensor's output.

Spatial Correction: In addition to correcting variations within individual pixels, nonuniformity correction may also involve spatial correction techniques. These methods account for global variations across the sensor array, such as temperature gradients or systematic biases across rows or columns of pixels.

Real-Time Adjustment: Advanced IR cameras may implement real-time or dynamic nonuniformity correction, continuously adjusting the gain and offset of pixels during image acquisition to compensate for temporal variations in sensor response.

Post-Processing: In some cases, nonuniformity correction can also be applied in post-processing software, where calibration data acquired during initial calibration or periodically during operation is used to adjust captured images offline.

NUC is crucial in IR imaging systems to ensure accurate and reliable thermal measurements. By minimizing fixed pattern noise and other artifacts caused by sensor variations, it enhances the quality and consistency of infrared images, making them more suitable for precise temperature measurements and qualitative analysis in various applications such as surveillance, industrial inspections, medical diagnostics, and scientific research.

As indicated above, shutter correction involves capturing a dark frame. Depending on the implementation, different types of image fields may be used in the calibration. Accordingly, a calibration shutter system, such as calibration shutter system 100 of FIGS. 1A and 1B, may be used. Specifically, shutter system 100 includes imaging optics 105 and shutter arm 110. Included on shutter arm 110 is a first optical element 115 and a second optical element 120. If imaging optics 105 provide for IR imaging and shutter arm 110 is used for NUC, then the first optical element 115 may provide a flat field reference target and second optical element 120 may provide a narcissus reference target. Flat field reference target 115 allows for imaging optics 105 to capture an image of a uniformly illuminated surface at a constant temperature. This reference image provides a baseline for the sensor's response across its entire field of view. By comparing this flat field reference to subsequent images captured during normal operation, algorithms can identify and correct for variations in pixel sensitivity. The process typically involves adjusting the gain and offset of each pixel to normalize their responses, thereby reducing fixed pattern noise and improving image quality. Narcissus reference target 120 is a reflective target that may be used to determine how internal reflections within the camera's optics or enclosure may affect the uniformity of the image. These reflections can arise from surfaces within the optical path and can introduce systematic biases in the detected IR radiation. The flat field reference 115 and the narcissus reference target 120 are just examples of optical elements that may be used. In other examples, optical elements 115 and 120 may be embodied as other types of reflective or refractive optical elements. Furthermore, optical elements may be used in conjunction with imaging optics 105 to acquire images, not just to calibrate imaging optics 105.

In order to place optical elements 115 and 120 within the optical path of imaging optics 105, shutter arm 110 is rotatably driven by drive motor 125 to different positions, with counterweight 130 easing the motion of shutter arm 110. Counterweight 130 may serve to stabilize shutter arm 110 in vibrating or rough environments. Counterweight 130 may also reduce the amount of torque that drive motor 125 needs to apply to rotate shutter arm 110. As illustrated in FIG. 1B, drive motor 125 may position shutter arm 110 such that neither of optical elements 115 and 120 are arranged within the optical path of imaging optics 105 (as illustrated in shutter arm position 110a), such that optical element 115 is arranged within the optical path of imaging optics 105 (not illustrated), or such that optical element 120 is arranged within the optical path of imaging optics 105 (as illustrated in shutter arm position 110b).

Figure 1B:
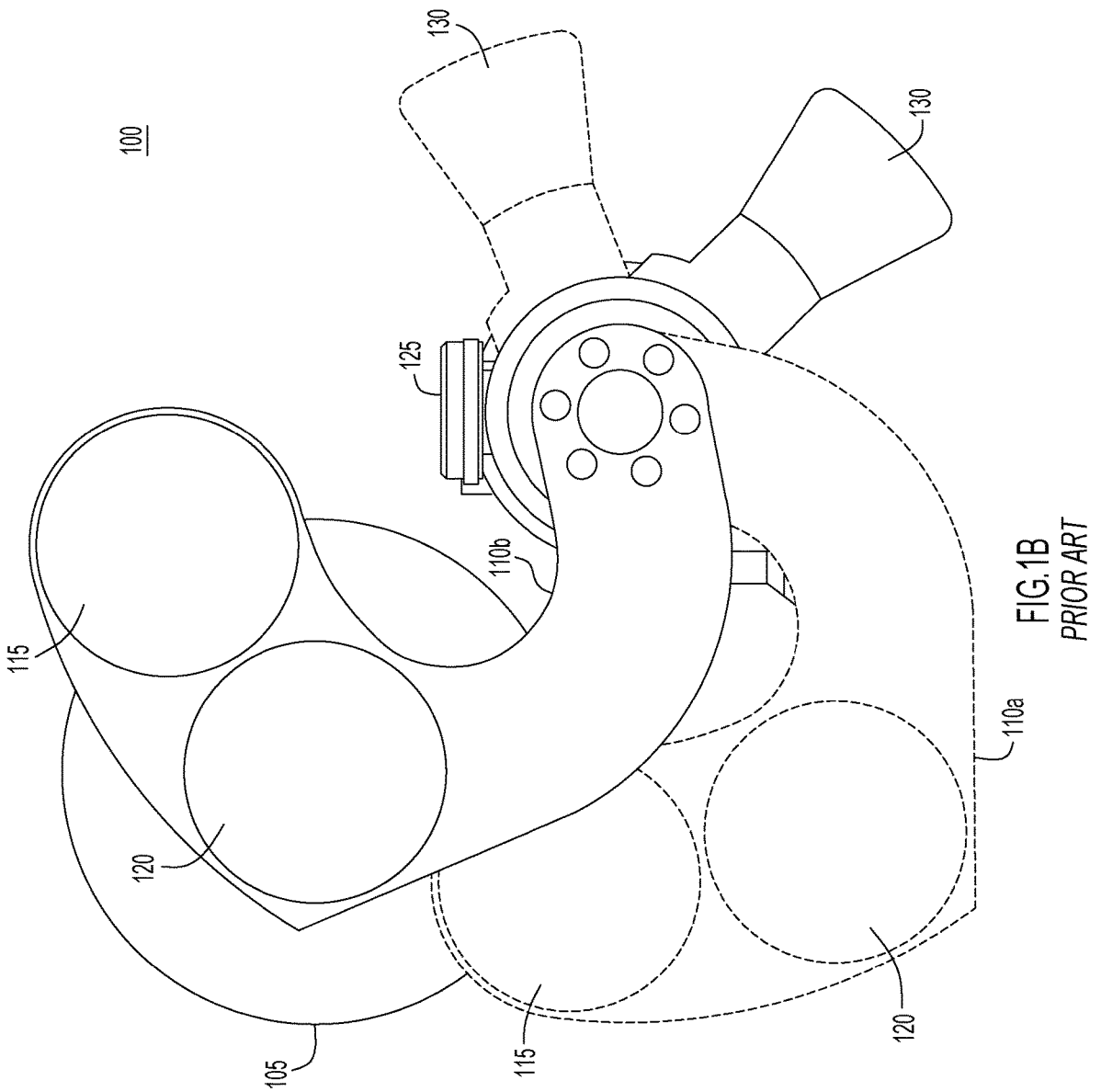
FIG. 1B illustrates an optical shutter system in a second of three positions.

An arrangement like that of FIGS. 1A and 1B may provide certain benefits. For example, a single drive motor may be used to drive multiple optical elements in and out of the optical path of imaging optics 105. This arrangement, however, is fairly large. For example, as illustrated in FIG. 1B, the cross section of shutter arm 110 expands substantially outside the cross section of imaging optics 105. In other words, shutter arm 110 necessitates a large swept volume in which to operate. Accordingly, the inventor of this disclosure has developed the techniques disclosed herein to maintain the benefits of a single drive motor shutter system, while providing the shutter system with a smaller footprint relative to that of shutter system 100 of FIGS. 1A and 1B. Specifically, the inventor has developed a shutter system in which a single drive motor drives optical element-specific engagement protrusions that engage with engagement surfaces or slots of the optical elements in an offset fashion such that the optical elements are separately driven into the optical path of the imaging device. A first example of such a shutter system will now be described with reference to FIGS. 2A and 2B.

Figure 2A:
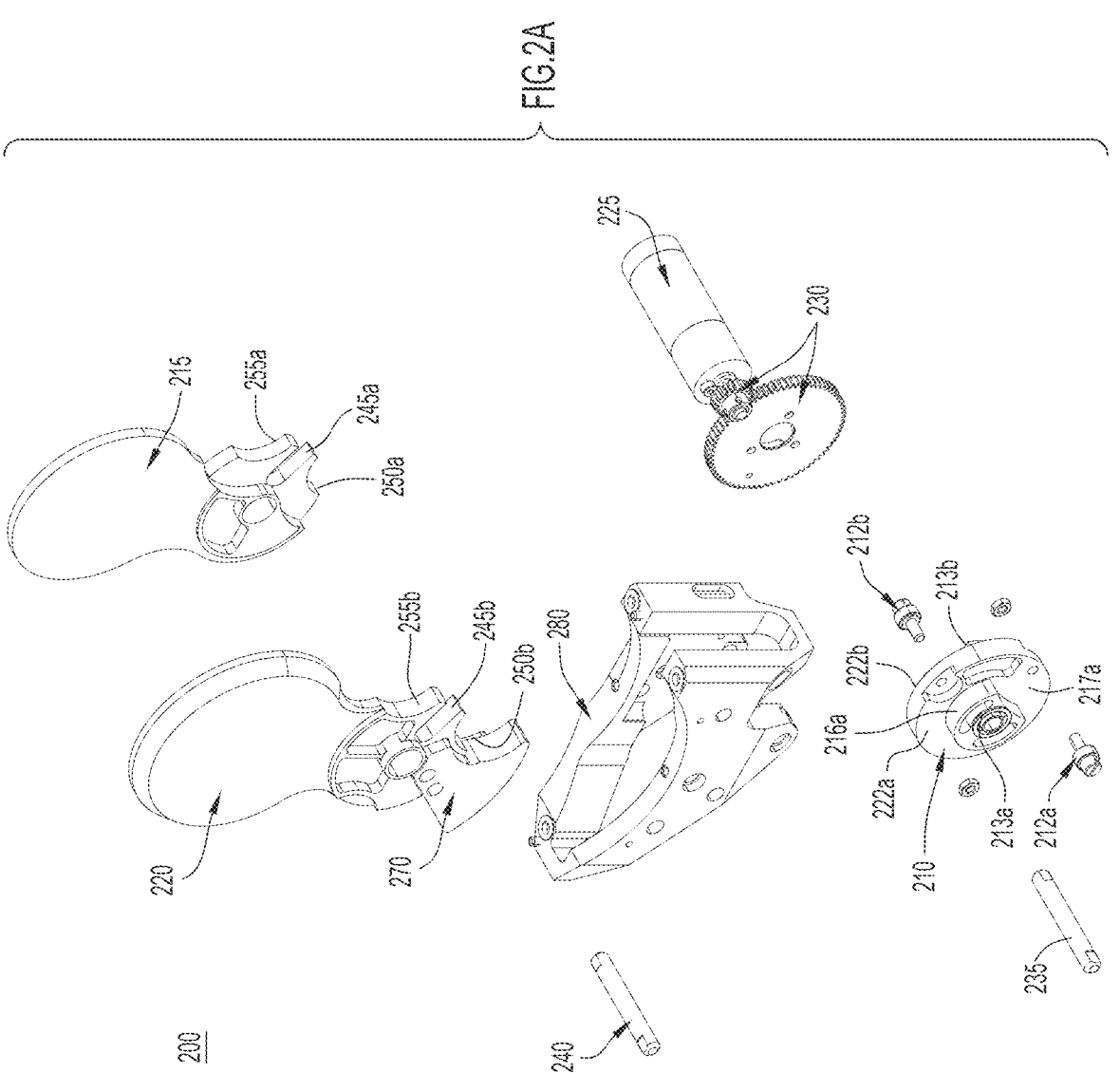
FIG. 2A provides an exploded view of a Geneva drive-based optical shutter system, according to an example embodiment.
Figure 2B:
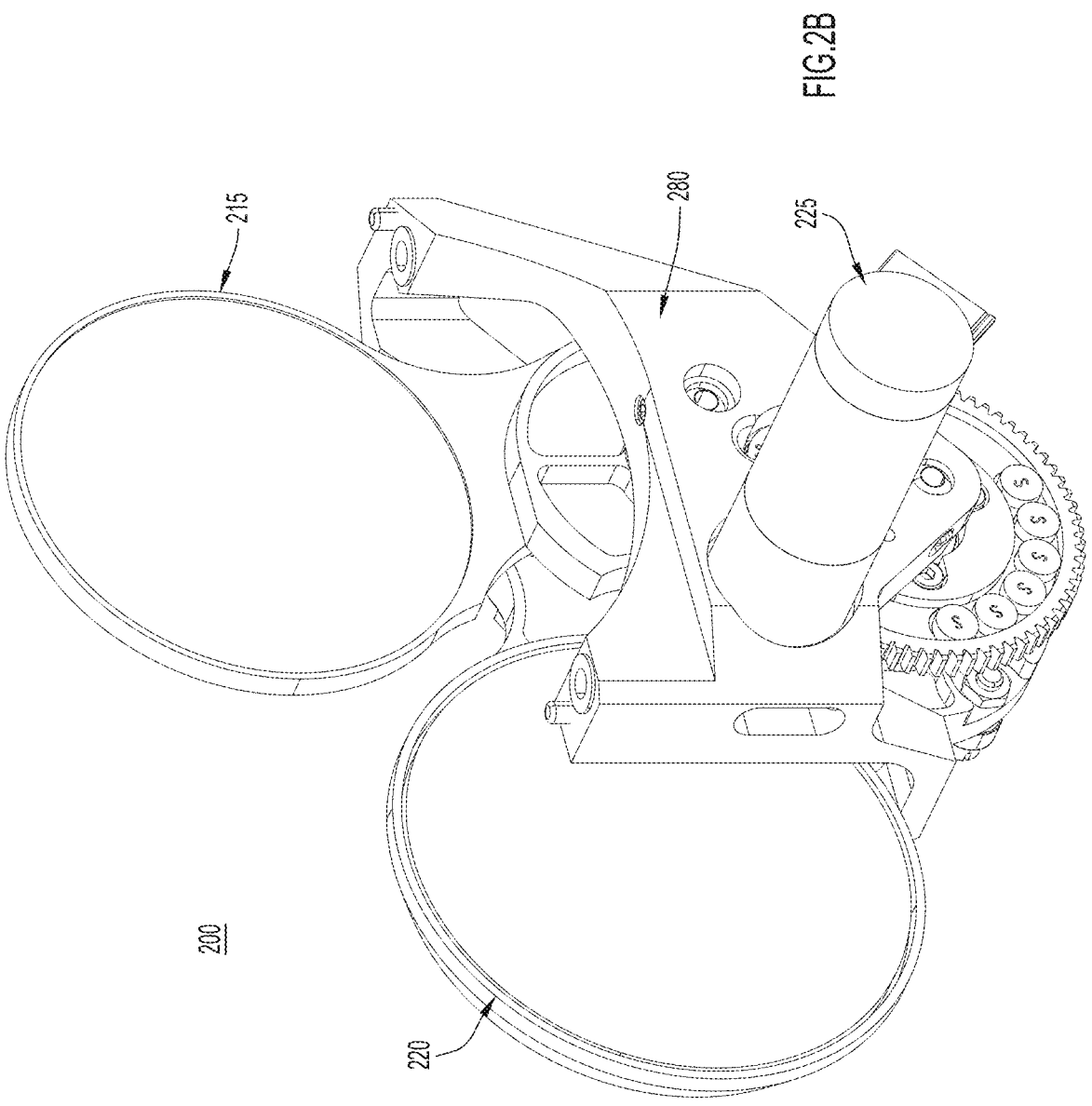
FIG. 2B provides a perspective view of a Geneva drive-based optical shutter system, according to an example embodiment.

Illustrated in FIGS. 2A and 2B is a shutter system 200 in exploded and perspective views, respectively. Shutter system implements a Geneva drive system to separately drive optical elements into an optical path. Shutter system 200 includes optical element paddles 215 and 220, which may be embodied as flat and reflective targets, respectively, and a crank 210 that includes protrusion or cam follower 212a (arranged on a first side 222a) and protrusion or cam follower 212b (arranged on a second side 222b). Also included on crank 210 are block 213a (arranged on first side 222a) and block 213b (arranged on a second side 222b). Blocks 213a/b include a concave surface 216a/b and a convex surface 217a/b. Motor 225 and reduction gears 230 drive the crank 210 about crank shaft 235. Optical element paddles 215 and 220 are rotatably mounted on paddle shaft 240. Each of optical element paddles 215 and 220 includes a slot 245a, 245b, first engagement surface 250a, 250b and second engagement surface 255a, 255b. One or both of optical element paddles may be equipped with a counterweight 270. The above described elements are supportably arranged in chassis 280.

The combination of the slots 245a/b, first and second engagement surfaces 250a/b and 255a/b, crank 210, blocks 213a/b and protrusions 212a/b form a Geneva drive system that allows optical element paddles 215 and 220 to be separately rotated into and removed from the optical path of an imaging system. A Geneva drive is a type of indexing mechanism used to convert continuous rotational motion into intermittent rotational motion.

Figures 3A, 3B, 3C, 3D:
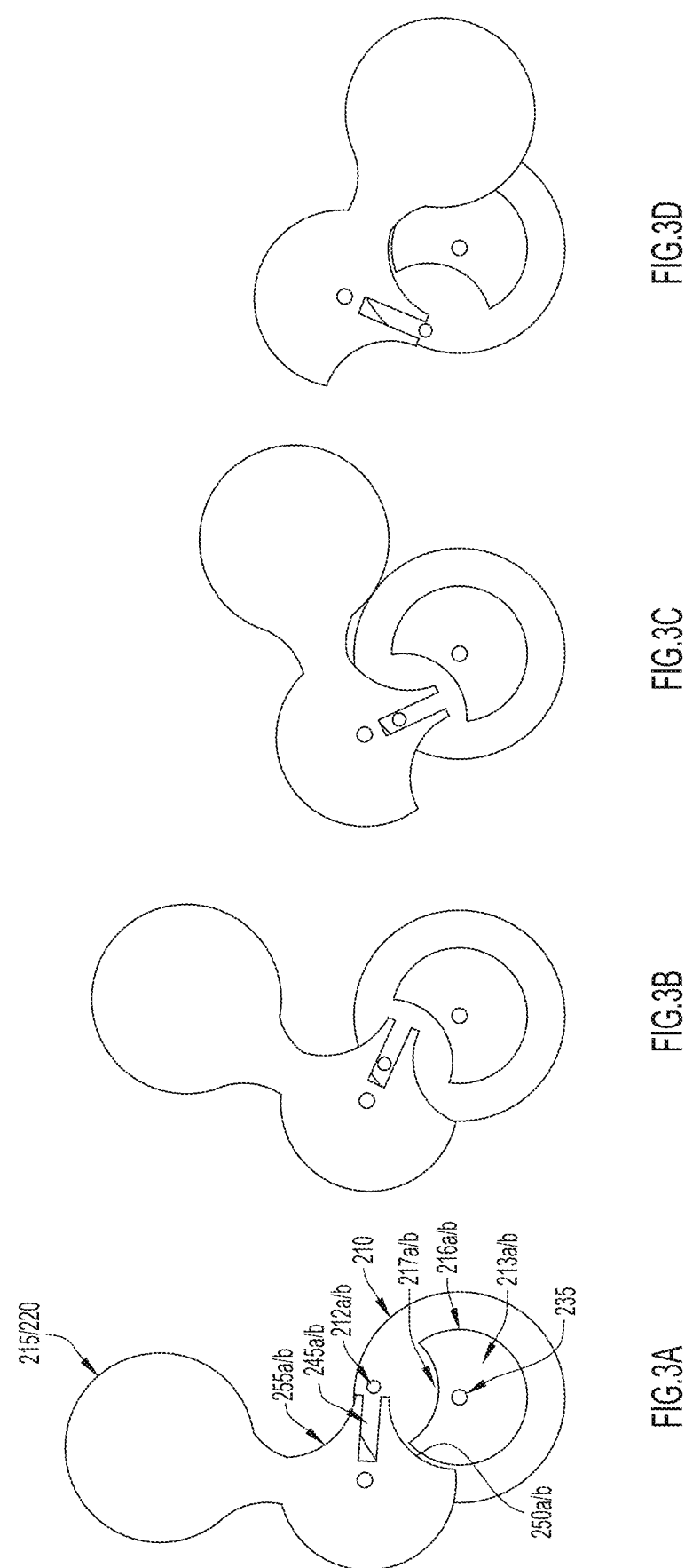
FIGS. 3A-D illustrate the positioning of an optical element using a Geneva drive-based optical shutter system, according to an example embodiment.

When the crank 210 is driven by motor 225, the protrusions 212a and 212b engage with the slots 245a and 245b, respectively. Specifically, as illustrated in FIGS. 3A-D, when protrusion 212a/b engages with slot 245a/b, the motion of crank 210 drives rotation of optical element paddle 215/220. For example, when crank 210 rotates in a counterclockwise direction (i.e., crank 210 rotates in a direction moving from FIG. 3A to FIG. 3D), optical element paddle 215/220 is driven to a clockwise direction by the engagement of protrusion 212a/b with slot 245a/b. On the other hand, when crank 210 rotates in a clockwise direction (i.e., crank 210 rotates in a direction moving from FIG. 3D to FIG. 3A), optical element paddle 215/220 is driven in a counterclockwise direction by the engagement of protrusion 212a/b with slot 245a/b. When protrusion 212a/b disengages from slot 245a/b, optical element paddles 215/220 are held in position by engagement between convex surface 216a/b of block 213a/b and first engagement surface 250a/b (as illustrated in FIG. 3A) or between convex surface 216a/b of block 213a/b and second engagement surface 255a/b (as illustrated in FIG. 3D).

Figures 4A, 4B, 4C:
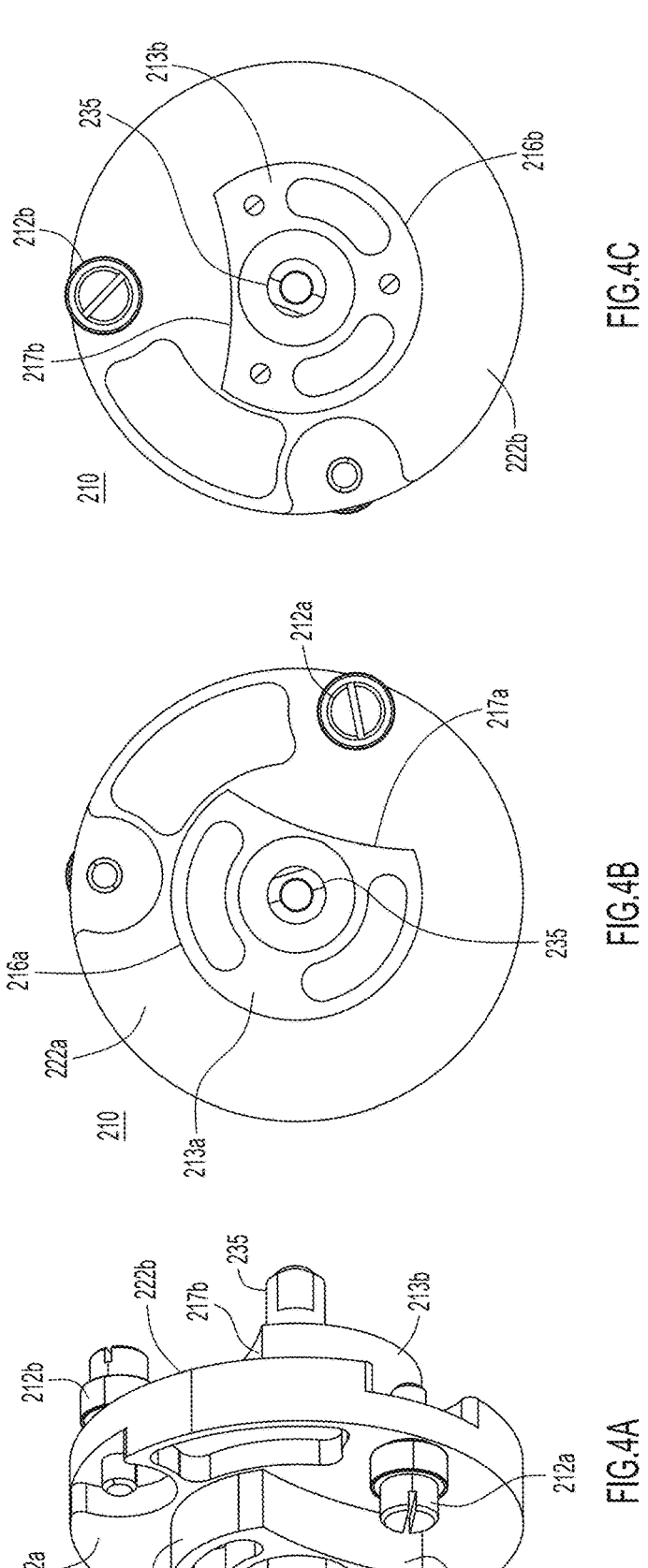
FIG. 4A provides a perspective view of a crank included in a Geneva drive-based optical shutter system, according to an example embodiment.
FIG. 4B provides a front view of a crank included in a Geneva drive-based optical shutter system, according to an example embodiment.
FIG. 4C provides a back view of a crank included in a Geneva drive-based optical shutter system, according to an example embodiment.

While FIGS. 3A-D illustrate the motion of one of optical element paddles 215 and 220, shutter system 200 may be configured to operate these paddles independently by angularly offsetting block 213a and protrusion 212a from block 213b and protrusion 212b. As illustrated in FIGS. 4A-C, which illustrate crank 210 in a perspective view (FIG. 4A), from the first side 222a (FIG. 4B) and from second side 222b (FIG. 4C). As illustrated in these figures, protrusion 212a (on the first side 222a of crank 210) lines up with the portions of block 213b (on the second side 222b of crank 210) that includes concave surface 216b. Similarly, protrusion 212b (on the second side 222b of crank 210) lines up with the portions of block 213a (on the first side 222a of crank 210) that includes concave surface 216a. Accordingly, protrusion 212a will drive first optical element paddle 215 when second optical element paddle is being held in place by concave surface 216b. Similarly, protrusion 212b will drive second optical element paddle 220 when first optical element paddle 215 is being held in place on concave surface 216a. This offset between block 213a and protrusion 212a relative to block 213b and protrusion 212b allows the shutter system 200 of FIGS. 2A-B, 3A-D and 4A-C to independently drive the first optical element paddle 215 and second optical element paddle 220 using a single drive motor 225.

In summary, shutter system 200 may provide for improved swapping of optical elements by reducing the swept volume of the mechanics. The Geneva principal inherently locks the target paddles in both the engaged and retracted positions, eliminating motor holding ability. Additionally, a twin-drive crankshaft keeps the assembly compact. Any angle of travel up to 120 degrees can be achieved, and more paddles can be added with additional crankshafts that are axially coupled.

Figures 5A, 5B, 5C:
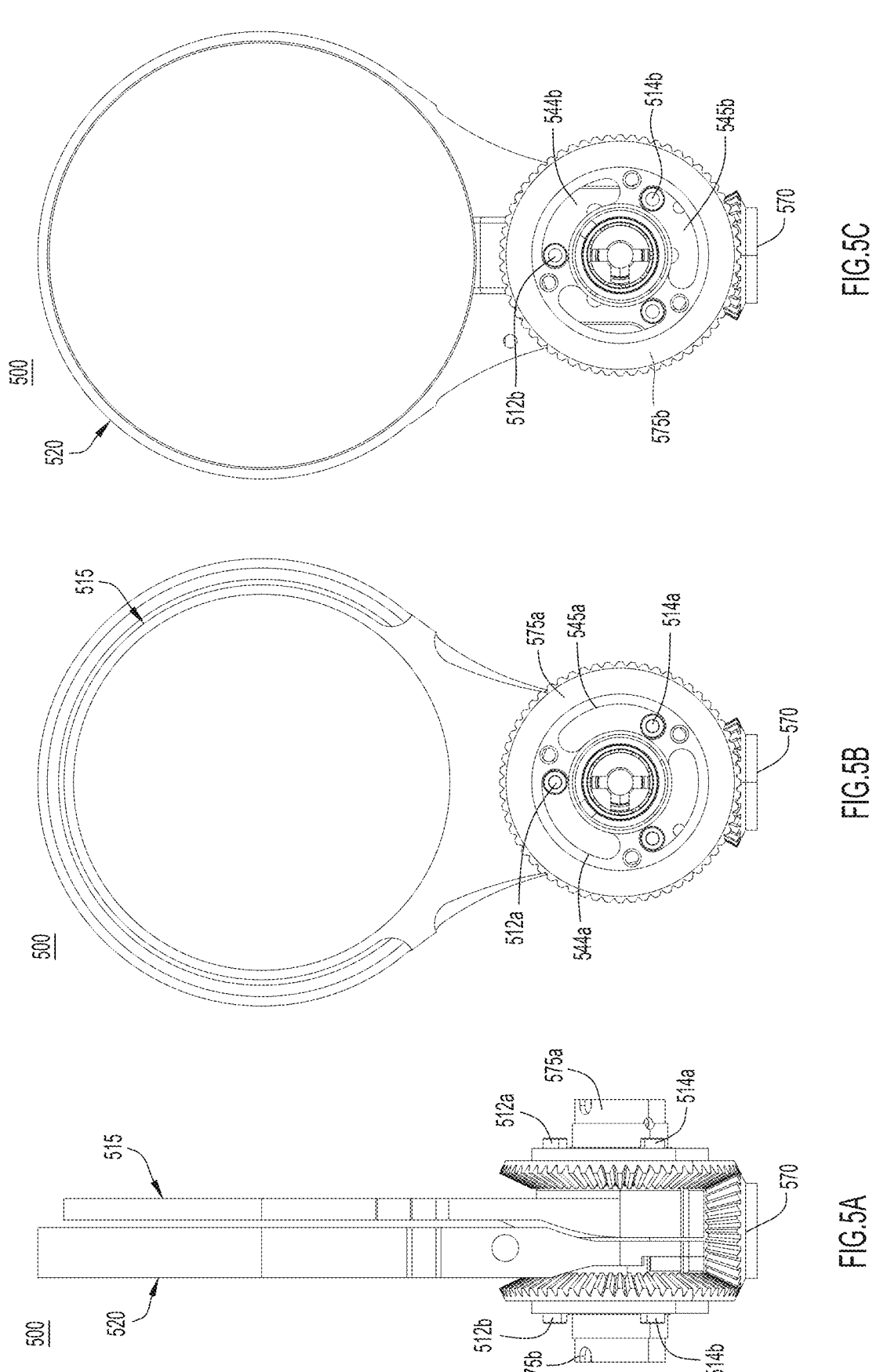
FIG. 5A provides a side view of a bevel gear drive-based optical shutter system, according to an example embodiment.
FIG. 5B provides a front view of a bevel gear drive-based optical shutter system, according to an example embodiment.
FIG. 5C provides a back view of a bevel gear drive-based optical shutter system, according to an example embodiment.

With reference now made to FIGS. 5A-C, depicted therein is another example of the disclosed techniques in which a bevel gear drive is used to implement the disclosed techniques in shutter system 500. Specifically, shutter system 500 includes a driving gear 570 that drives two driven gears 575a and 575b. The driven gears 575a and 575b are arranged such that when driven gear 575a is driven in a clockwise direction, driven gear 575b is driven in a counterclockwise direction, and vice versa. Like shutter system 200, shutter system 500 includes a first optical element paddle 515 and second optical element paddle 520. In shutter system 200, protrusions 212a and 212b are arranged on crank 210 and engage slots 245a and 245b in optical element paddles 215 and 220, respectively. In shutter system 500, protrusions 512a and 514a are provided on optical element paddle 515 and protrusions 512b and 514b are provided on optical element paddle 520. Protrusions 512a and 514a are arranged within radial slots 544a and 545a, respectively, in driven gear 575a, and protrusions 512b and 514b are arranged within radial slots 544b and 545b, respectively, in driven gear 575b. As understood by the skilled artisan, the radial slots may be provided on the optical element paddles and the protrusions provided on the driven gears without deviating from the techniques disclosed herein.

When driven gear 575a is driven clockwise (as illustrated in FIG. 5B), optical element paddle 515 is rotated clockwise due to protrusions 512a and 514a engaging with radial slots 544a and 545a, respectively, and when gear 575a is driven counterclockwise (as illustrated in FIG. 5B), optical element paddle 515 is rotated counterclockwise due to protrusions 512a and 514a engaging with radial slots 544a and 545a, respectively. Similarly, when driven gear 575b is driven clockwise (as illustrated in FIG. 5C), optical element paddle 520 is rotated clockwise due to protrusions 512b and 514b engaging with the inner surfaces of radial slots 544b and 545b, respectively, and when gear 575b is driven counterclockwise (as illustrated in FIG. 5B), optical element paddle 520 is rotated counterclockwise due to protrusions 512b and 514b engaging with the inner surfaces of radial slots 544b and 545b, respectively.

As illustrated in FIGS. 5B and 5C, radial slots 544a and 545a of driven gear 575a are angularly offset from radial slots 544b and 545b of driven gear 575b. Accordingly, when driven gear 575a is driven such that optical element paddle 515 rotates due to engagement between radial slot 544a and protrusion 512a and engagement between radial slot 545a and protrusion 514a, optical element paddle 520 remains stationary as radial slot 544b rotates without engaging protrusion 512b and radial slot 545b rotates without engaging protrusion 514b. Similarly, when driven gear 575b is driven such that optical element paddle 520 rotates due to engagement between radial slot 544b and protrusion 512b and engagement between radial slot 545b and protrusion 514b, optical element paddle 515 remains stationary as radial slot 544a rotates without engaging protrusion 512a and radial slot 545a rotates without engaging protrusion 514a.

Figure 6A:
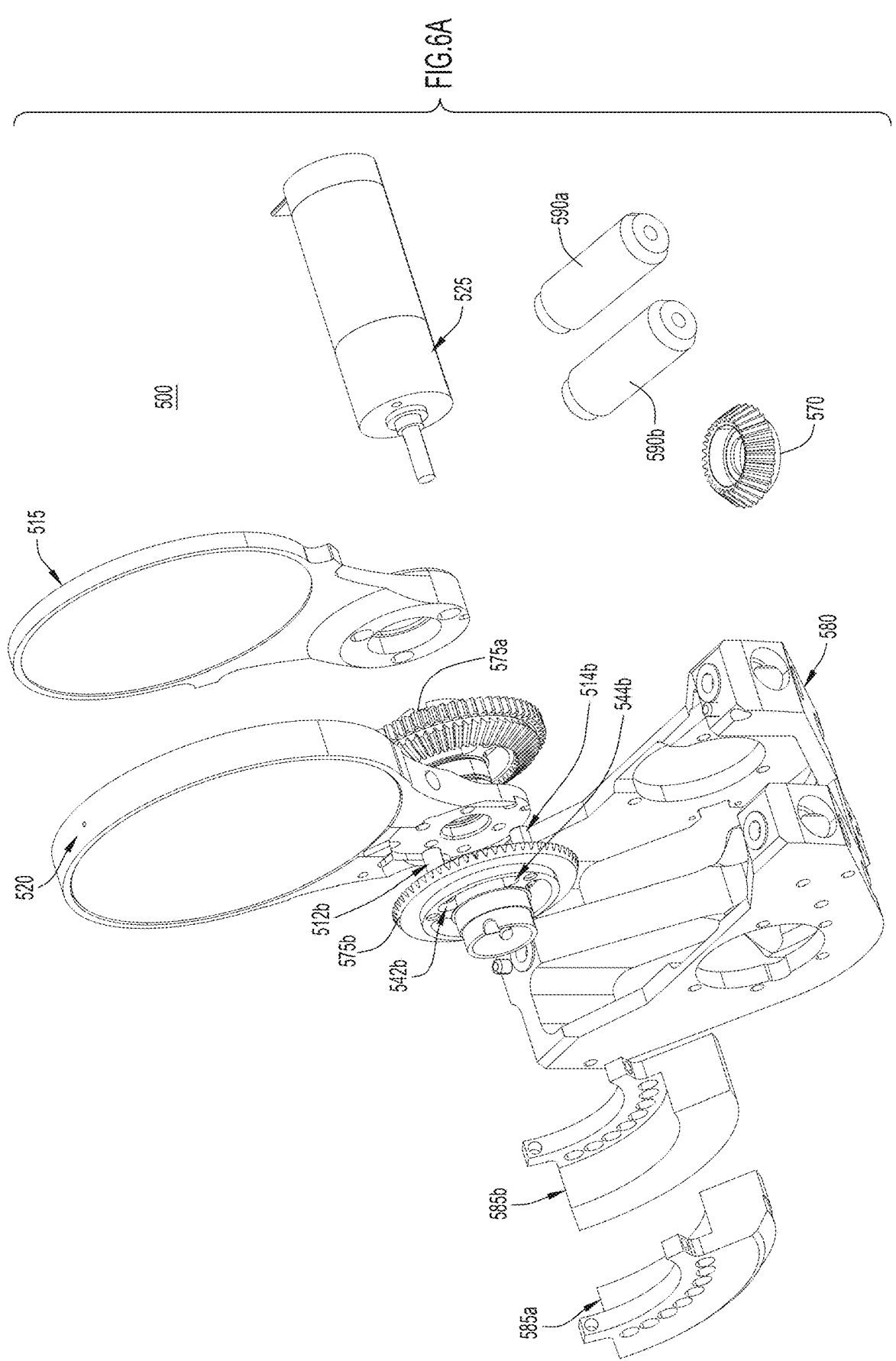
FIG. 6A provides an exploded view of a bevel gear drive-based optical shutter system, according to an example embodiment.
Figure 6B:
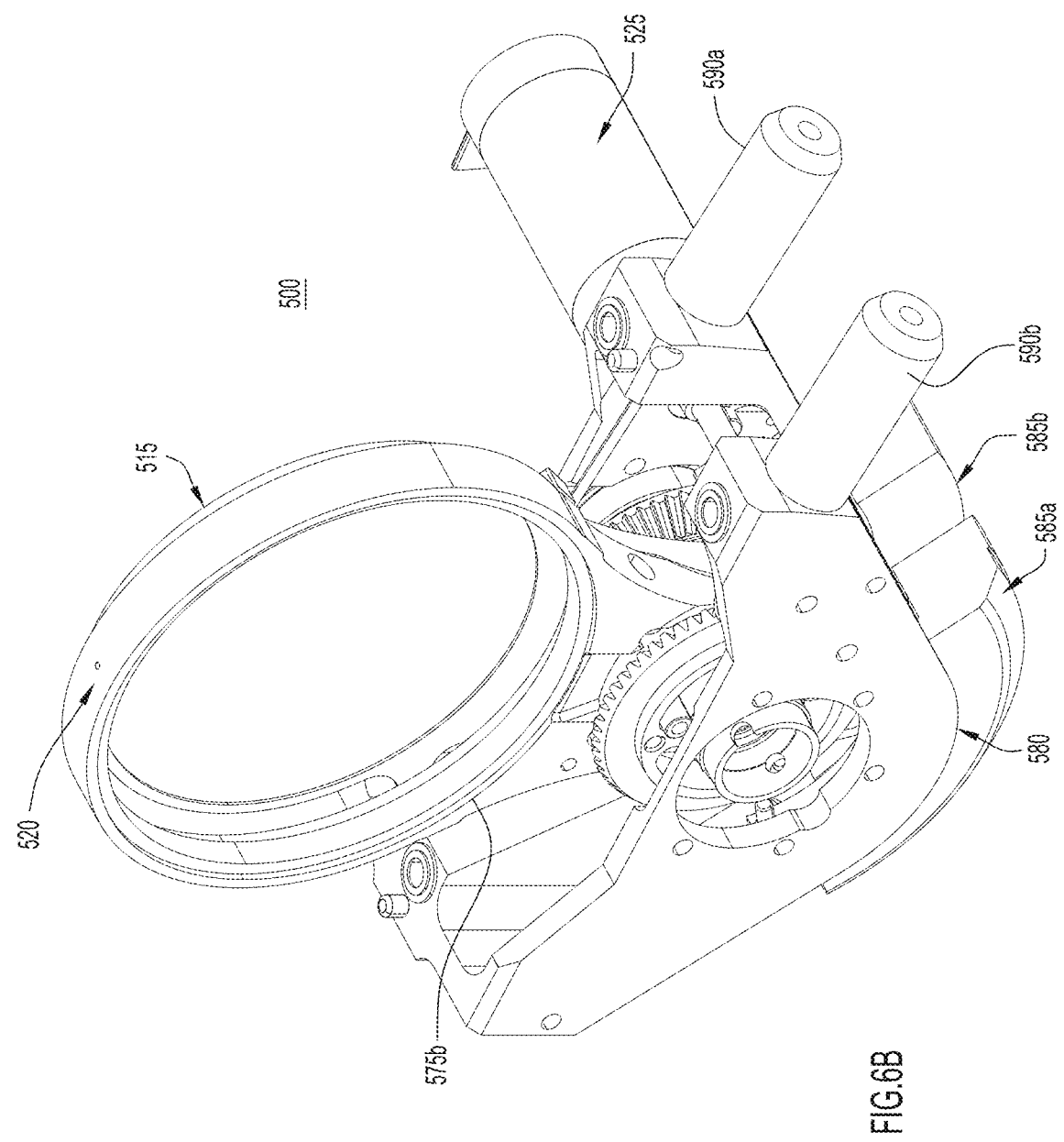
FIG. 6B provides a perspective view of a bevel gear drive-based optical shutter system, according to an example embodiment.

Turning to FIGS. 6A and 6B, illustrated therein is shutter system 500 in exploded and perspective views, respectively, arranged within a chassis 580. As illustrated in these figures, shutter system 500 may provide for a shutter system with a reduced volume, similar to that of shutter system 200. As also illustrated in these figures, a single motor 525 may be used to individually position optical element paddles 515 and 520 within an optical path, such as the optical path of IR imaging optics.

Also illustrated in FIGS. 6A and 6B are counterweights 585a and 585b and restoring springs 590a and 590b. Counterweight 585a works in conjunction with restoring spring 590a to ensure the optical element paddle 515 remains in the positions to which it is rotated by driven gear 575b, and counterweight 585b and restoring spring 590b provide a similar function for optical element paddle 520.

In summary, shutter system 500 provides three discrete optical positions in a two-position effective space. This is achieved by using a counter-rotation mechanism and a radially slotted hub with a restoring spring for both optical paddles. The combination of the bevel gear drive, slotted hub and spring creates a timing delay in the mechanics which allows an intermediate (optically open) position.

As illustrated through the discussion above, the techniques of this disclosure are generally directed to an apparatus, such as a shutter system, in which a plurality of optical elements are arranged on a common rotational axis. The examples described above illustrate two optical elements arranged on optical element paddles. Other examples, however, may include a greater number of optical elements and may be mounted to the axis using other elements known to the skilled artisan. The disclosed techniques utilize a single motor to individually rotate the optical elements in and out of an optical path. More specifically the motor drives a drive system that includes a protrusion and a slot for each of the optical elements. By driving the drive system through a first range of motion, the protrusion for the first optical element engages with the slot for the first optical element, driving the first optical element from a first position to a second position. The first position may be outside the optical path and the second position may be in the optical path, or vice versa. By driving the drive system through a second range of motion, the protrusion for the second optical element engages with the slot for the second optical element, driving the second optical element from a third position to a fourth position. The third position may be outside the optical path and the fourth position may be in the optical path, or vice versa.

With reference now made to FIG. 7, depicted therein is a flowchart 700 providing a process flow for operating a shutter system, such as shutter system 200 or 500, according to the disclosed techniques. Flowchart 700 begins in operation 710 in which a first optical element is provided such that the first optical element is rotatably arranged on an axis. Similarly, in operation 720, a second optical element is provided such that it is rotatably arranged on the axis.

Next, in operation 730, a drive system is driven through a first range of motion to engage a first protrusion with a first slot to rotate the first optical element from a first position to a second position, Operation 730 may be embodied as shutter system 200 driving optical element paddle 215 or 220. Accordingly, the slot referred to in this operation may be a slot in the optical element paddle that engages with the protrusion of the crank of the Geneva drive. Operation 730 may also be embodied as shutter system 500 driving optical element paddle 515 or 520. Accordingly, the slot referred to in this operation may be a radial slot formed in a driven gear of a bevel drive system, and the protrusion may be a protrusion formed on the optical element paddle. In operation 730, the drive system may be driven through the first range of motion in a first direction to rotate the first optical element into an optical path of an optical imaging system, or the drive system may be driven through the first range of motion in a second direction to rotate the first optical element out of the optical path of the optical imaging system.

Operation 740 is similar to operation 730, but it is the second optical element that is driven. Accordingly, in operation 740, the drive system is driven through a second range of motion to engage a second protrusion with a second slot to rotate the second optical element from a third position to a fourth position. Operation 740 may be embodied as shutter system 200 driving optical element paddle 215 or 220. Accordingly, the slot referred to in this operation may be a slot in the optical element paddle that engages with the protrusion of the crank of the Geneva drive. Operation 740 may also be embodied as shutter system 500 driving optical element paddle 515 or 520. Accordingly, the slot referred to in this operation may be a radial slot formed in a driven gear of a bevel drive system, and the protrusion may be a protrusion formed on the optical element paddle. In operation 740, the drive system may be driven through the second range of motion in a third direction to rotate the second optical element into an optical path of an optical imaging system, or the drive system may be driven through the second range of motion in a fourth direction to rotate the second optical element out of the optical path of the optical imaging system.

The operations of flowchart 700 may be performed as part of a calibration process of, for example, an IR imaging system, but the process flow of flowchart 700 is not limited to this use case. For example, the operations of flowchart 700 may also be carried out while operating an imaging system to capture images with the first and second optical elements configuring the imaging system with different imaging characteristics, such as different levels of zoom, different levels of magnification, different apertures, and other optical characteristics known to the skilled artisan.

In summary, the techniques described herein relate to an apparatus including: a first optical element rotatably mounted to an axis; a second optical element rotatably mounted to the axis; a drive system including: a first protrusion associated with the first optical element, a first slot associated with the first optical element, a second protrusion associated with the second optical element, and a second slot associated with the second optical element; and a motor configured to: drive the drive system through a first range of motion to engage the first protrusion with the first slot to rotate the first optical element from a first position to a second position, and drive the drive system through a second range of motion to engage the second protrusion with the second slot to rotate the second optical element from a third position to a fourth position.

In some aspects, the techniques described herein relate to an apparatus, wherein: the first optical element is arranged on a first optical element paddle including a first orifice through which the axis passes; and the second optical element is arranged on a second optical element paddle including a second orifice through which the axis passes.

In some aspects, the techniques described herein relate to an apparatus, wherein the drive system includes a Geneva drive including a crank driven by the motor, a first block arranged on the crank and associated with the first optical element paddle and a second block arranged on the crank and associated with the second optical element paddle, wherein: the first protrusion is arranged on the crank; the first slot is arranged on the first optical element paddle; the second protrusion is arranged on the crank; and the second slot is arranged on the first optical element paddle.

In some aspects, the techniques described herein relate to an apparatus, wherein the first block and the first protrusion are rotationally offset on the crank from the second block and the second protrusion.

In some aspects, the techniques described herein relate to an apparatus, wherein the drive system includes a driver bevel gear driven by the motor, a first driven bevel gear driven by the driver bevel gear and associated with the first optical element paddle and a second driven bevel gear driven by the driver bevel gear and associated with the second optical element paddle, wherein: the first protrusion is arranged on first optical element paddle; the first slot includes a first radial slot arranged on the first driven bevel gear; the second protrusion is arranged on second optical element paddle; and the second slot includes a second radial slot arranged on the second driven bevel gear.

In some aspects, the techniques described herein relate to an apparatus, wherein the first radial slot is rotationally offset along the axis from the second radial slot.

In some aspects, the techniques described herein relate to an apparatus, wherein the first protrusion is rotationally offset along the axis from the second protrusion.

In some aspects, the techniques described herein relate to a method including: providing a first optical element rotatably arranged on an axis; providing a second optical element rotatably arranged on the axis; driving a drive system through a first range of motion to engage a first protrusion with a first slot to rotate the first optical element from a first position to a second position; and driving the drive system through a second range of motion to engage a second protrusion with a second slot to rotate the second optical element from a third position to a fourth position.

In some aspects, the techniques described herein relate to a method, wherein: providing the first optical element includes providing the first optical element on a first optical element paddle; and providing the second optical element includes providing the second optical element on a second optical element paddle.

In some aspects, the techniques described herein relate to a method, wherein driving the drive system through the first range of motion and the second range of motion includes a driving a Geneva drive including a crank, a first block arranged on the crank and associated with the first optical element paddle, and a second block arranged on the crank and associated with the second optical element paddle, wherein: the first protrusion is arranged on the crank; the first slot is arranged on the first optical element paddle; the second protrusion is arranged on the crank; and the second slot is arranged on the first optical element paddle.

In some aspects, the techniques described herein relate to a method, wherein driving the drive system through the first range of motion and the second range of motion includes a driving a bevel gear drive system including driver bevel gear, a first driven bevel gear driven by the driver bevel gear and associated with the first optical element paddle, and a second driven bevel gear driven by the driver bevel gear and associated with the second optical element paddle, wherein: the first protrusion is arranged on first optical element paddle; the first slot includes a first radial slot arranged on the first driven bevel gear; the second protrusion is arranged on second optical element paddle; and the second slot includes a second radial slot arranged on the second driven bevel gear.

In some aspects, the techniques described herein relate to a method, wherein driving the drive system through the first range of motion and the second range of motion includes driving the drive system as part of a calibration operation of an optical system.

In some aspects, the techniques described herein relate to a method, wherein the optical system includes an infrared imaging system and the calibration operation includes a nonuniformity correction operation.

In some aspects, the techniques described herein relate to an apparatus including: imaging optics that include an optical path through the imaging optics; a first optical element rotatably mounted to an axis; a second optical element rotatably mounted to the axis; a drive system including: a first protrusion associated with the first optical element, a first slot associated with the first optical element, a second protrusion associated with the second optical element, and a second slot associated with the second optical element; and a motor configured to: drive the drive system through a first range of motion to engage the first protrusion with the first slot to rotate the first optical element from a first position outside the optical path to a second position in the optical path, and drive the drive system through a second range of motion to engage the second protrusion with the second slot to rotate the second optical element from a third position outside the optical path to a fourth position in the optical path.

In some aspects, the techniques described herein relate to an apparatus, wherein: the first optical element is arranged on a first optical element paddle including a first orifice through which the axis passes; and the second optical element is arranged on a second optical element paddle including a second orifice through which the axis passes.

In some aspects, the techniques described herein relate to an apparatus, wherein the drive system includes a Geneva drive including a crank driven by the motor, a first block arranged on the crank and associated with the first optical element paddle and a second block arranged on the crank and associated with the second optical element paddle, wherein: the first protrusion is arranged on the crank; the first slot is arranged on the first optical element paddle; the second protrusion is arranged on the crank; and the second slot is arranged on the first optical element paddle.

In some aspects, the techniques described herein relate to an apparatus, wherein the first block and the first protrusion are rotationally offset on the crank from the second block and the second protrusion.

In some aspects, the techniques described herein relate to an apparatus, wherein the drive system includes a driver bevel gear driven by the motor, a first driven bevel gear driven by the driver bevel gear and associated with the first optical element paddle and a second driven bevel gear driven by the driver bevel gear and associated with the second optical element paddle, wherein: the first protrusion is arranged on first optical element paddle; the first slot includes a first radial slot arranged on the first driven bevel gear; the second protrusion is arranged on second optical element paddle; and the second slot includes a second radial slot arranged on the second driven bevel gear.

In some aspects, the techniques described herein relate to an apparatus, wherein the first radial slot is rotationally offset along the axis from the second radial slot.

In some aspects, the techniques described herein relate to an apparatus, wherein the first protrusion is rotationally offset along the axis from the second protrusion.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

It is also to be understood that the apparatuses described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc. the phrase 'between X and Y' represents a range that includes X and Y.

For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Similarly, when used herein, the term "comprises" and its derivatives (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

What is claimed is:

1. An apparatus comprising:
a first optical element rotatably mounted to an axis;
a second optical element rotatably mounted to the axis;
a drive system comprising:
    a first protrusion associated with the first optical element,
    a first slot associated with the first optical element,
    a second protrusion associated with the second optical element, and
    a second slot associated with the second optical element; and
a motor configured to:
    drive the drive system through a first range of motion to engage the first protrusion with the first slot to rotate the first optical element from a first position to a second position, and
    drive the drive system through a second range of motion to engage the second protrusion with the second slot to rotate the second optical element from a third position to a fourth position.

2. The apparatus of claim 1, wherein:
the first optical element is arranged on a first optical element paddle comprising a first orifice through which the axis passes; and
the second optical element is arranged on a second optical element paddle comprising a second orifice through which the axis passes.

3. The apparatus of claim 2, wherein the drive system comprises a Geneva drive comprising a crank driven by the motor, a first block arranged on the crank and associated with the first optical element paddle and a second block arranged on the crank and associated with the second optical element paddle, wherein:
the first protrusion is arranged on the crank;
the first slot is arranged on the first optical element paddle;
the second protrusion is arranged on the crank; and
the second slot is arranged on the first optical element paddle.

4. The apparatus of claim 3, wherein the first block and the first protrusion are rotationally offset on the crank from the second block and the second protrusion.

5. The apparatus of claim 2, wherein the drive system comprises a driver bevel gear driven by the motor, a first driven bevel gear driven by the driver bevel gear and associated with the first optical element paddle and a second driven bevel gear driven by the driver bevel gear and associated with the second optical element paddle, wherein:

the first protrusion is arranged on first optical element paddle;

the first slot comprises a first radial slot arranged on the first driven bevel gear;

the second protrusion is arranged on second optical element paddle; and the second slot comprises a second radial slot arranged on the second driven bevel gear.

6. The apparatus of claim 5, wherein the first radial slot is rotationally offset along the axis from the second radial slot.

7. The apparatus of claim 5, wherein the first protrusion is rotationally offset along the axis from the second protrusion.

8. A method comprising:

providing a first optical element rotatably arranged on an axis;

providing a second optical element rotatably arranged on the axis;

driving a drive system through a first range of motion to engage a first protrusion with a first slot to rotate the first optical element from a first position to a second position; and driving the drive system through a second range of motion to engage a second protrusion with a second slot to rotate the second optical element from a third position to a fourth position.

9. The method of claim 8, wherein:

providing the first optical element comprises providing the first optical element on a first optical element paddle; and providing the second optical element comprises providing the second optical element on a second optical element paddle.

10. The method of claim 9, wherein driving the drive system through the first range of motion and the second range of motion comprises a driving a Geneva drive comprising a crank, a first block arranged on the crank and associated with the first optical element paddle, and a second block arranged on the crank and associated with the second optical element paddle, wherein:

the first protrusion is arranged on the crank;

the first slot is arranged on the first optical element paddle;

the second protrusion is arranged on the crank; and the second slot is arranged on the first optical element paddle.

11. The method of claim 9, wherein driving the drive system through the first range of motion and the second range of motion comprises a driving a bevel gear drive system comprising driver bevel gear, a first driven bevel gear driven by the driver bevel gear and associated with the first optical element paddle, and a second driven bevel gear driven by the driver bevel gear and associated with the second optical element paddle, wherein:

the first protrusion is arranged on first optical element paddle;

the first slot comprises a first radial slot arranged on the first driven bevel gear;

the second protrusion is arranged on second optical element paddle; and the second slot comprises a second radial slot arranged on the second driven bevel gear.

12. The method of claim 8, wherein driving the drive system through the first range of motion and the second range of motion comprises driving the drive system as part of a calibration operation of an optical system.

13. The method of claim 12, wherein the optical system comprises an infrared imaging system and the calibration operation comprises a nonuniformity correction operation.

14. An apparatus comprising:

imaging optics that include an optical path through the imaging optics;

a first optical element rotatably mounted to an axis;

a second optical element rotatably mounted to the axis;

a drive system comprising:

a first protrusion associated with the first optical element, a first slot associated with the first optical element, a second protrusion associated with the second optical element, and a second slot associated with the second optical element; and a motor configured to:

drive the drive system through a first range of motion to engage the first protrusion with the first slot to rotate the first optical element from a first position outside the optical path to a second position in the optical path, and drive the drive system through a second range of motion to engage the second protrusion with the second slot to rotate the second optical element from a third position outside the optical path to a fourth position in the optical path.

15. The apparatus of claim 14, wherein:

the first optical element is arranged on a first optical element paddle comprising a first orifice through which the axis passes; and the second optical element is arranged on a second optical element paddle comprising a second orifice through which the axis passes.

16. The apparatus of claim 15, wherein the drive system comprises a Geneva drive comprising a crank driven by the motor, a first block arranged on the crank and associated with the first optical element paddle and a second block arranged on the crank and associated with the second optical element paddle, wherein:

the first protrusion is arranged on the crank;

the first slot is arranged on the first optical element paddle;

the second protrusion is arranged on the crank; and the second slot is arranged on the first optical element paddle.

17. The apparatus of claim 16, wherein the first block and the first protrusion are rotationally offset on the crank from the second block and the second protrusion.

18. The apparatus of claim 15, wherein the drive system comprises a driver bevel gear driven by the motor, a first driven bevel gear driven by the driver bevel gear and associated with the first optical element paddle and a second driven bevel gear driven by the driver bevel gear and associated with the second optical element paddle, wherein:

the first protrusion is arranged on first optical element paddle;

the first slot comprises a first radial slot arranged on the first driven bevel gear;

the second protrusion is arranged on second optical element paddle; and the second slot comprises a second radial slot arranged on the second driven bevel gear.

19. The apparatus of claim 18, wherein the first radial slot is rotationally offset along the axis from the second radial slot.

20. The apparatus of claim 18, wherein the first protrusion is rotationally offset along the axis from the second protrusion.

* * * * *